United States Patent
Wu et al.

(10) Patent No.: US 7,054,703 B2
(45) Date of Patent: May 30, 2006

(54) CONTROL SYSTEM AND METHODS FOR MANAGING A PRODUCTION OPERATING UNDER TIME CONSTARAINTS

(75) Inventors: Kan Wu, Hsinchu (TW); Wei-Jai Hung, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 429 days.

(21) Appl. No.: 10/658,826

(22) Filed: Sep. 9, 2003

(65) Prior Publication Data

US 2005/0055105 A1    Mar. 10, 2005

(51) Int. Cl.
  *G06F 19/00*    (2006.01)
(52) U.S. Cl. ............. 700/100; 700/97; 700/99; 700/101; 700/102; 700/103; 700/108; 700/121
(58) Field of Classification Search .......... 700/95, 700/96, 97, 99, 100, 101, 102, 103, 104, 700/105, 108, 14
See application file for complete search history.

(56) References Cited

U.S. PATENT DOCUMENTS

| | | | |
|---|---|---|---|
| 4,829,445 A * | 5/1989 | Burney | 700/230 |
| 5,099,431 A * | 3/1992 | Natarajan | 700/105 |
| 5,748,478 A * | 5/1998 | Pan et al. | 700/99 |
| 5,838,565 A * | 11/1998 | Hsieh et al. | 700/11 |
| 5,880,960 A * | 3/1999 | Lin et al. | 700/99 |
| 6,687,563 B1 * | 2/2004 | Wang et al. | 700/121 |
| 6,714,830 B1 * | 3/2004 | Browning | 700/102 |
| 2003/0200130 A1 * | 10/2003 | Kall et al. | 705/8 |

* cited by examiner

*Primary Examiner*—Ramesh Patel
(74) *Attorney, Agent, or Firm*—Thomas, Kayden, Horstemeyer & Risley

(57) ABSTRACT

A control system for a production process having a plurality of operations. A plurality of time constraints exist between the operations. The control system includes a control module that defines a plurality of sub-time constraints between each two operations, generates a plurality of equations according to the time constraints and the sub-time constraints, and calculates the sub-time constraints using the equations. The control module then determines whether a status for each operation defined according to a Work-In-Process (WIP) quantity between a first operation and a checked operation and a throughput rate thereof violates sub-time constraints between the first operation and the checked operation, and releases a lot into the production line if the status for each operation satisfies the corresponding sum of the sub-time constraints.

46 Claims, 6 Drawing Sheets

CONTROL SYSTEM AND METHODS FOR MANAGING A PRODUCTION OPERATING UNDER TIME CONSTARAINTS

BACKGROUND OF THE INVENTION

1. Field of the Invention

The present invention relates to a control system and methods for controlling a multiple operation production process having time constraints, and particularly to a control system and methods for controlling a production process with overlapping time constraints.

2. Description of the Related Art

Semiconductor manufacturing processes are often restricted by stringent production process requirements. Time constraints are one type of production process requirement that should be considered during the production of a lot of semiconductor devices. If time constraints are breached, for example, when the queue time of a lot exceeds process time constraints, the lot may need to be reworked or even scrapped. FIG. 1 illustrates a production line 100 with a plurality of operations ($O_1$, $O_2$, $O_3$, . . . , $O_{n-2}$, $O_{n-1}$, $O_n$), each of which includes at least one process step.

Generally, there are four types of time constraints in production processes: dual-operation, multi-operation, continuous, and overlapping time constraints. The dual-operation time constraint is a basic type of time constraint between two individual operations. FIG. 2A is a schematic diagram of a dual-operation time constraint. In FIG. 2A, production timeline 210 has two operations $O_1$ and $O_2$ with time constraint TC1 therebetween, that is, operations $O_1$ and $O_2$ must be performed on a product before the expiration of a period of time identified by time constraint TC1. As shown in FIG. 2B, the multi-operation time constraint is an extension of the dual-operation time constraint. In FIG. 2B, the production timeline 220 has four operations $O_3$, $O_4$, $O_5$ and $O_6$, with time constraint TC2 therebetween, that is, operations $O_3$, $O_4$, $O_5$ and $O_6$ must be performed on a product before the expiration of a period of time identified by time constraint TC2.

FIG. 2C is a schematic diagram of a continuous time constraint. The continuous time constraint is a combination of time constraints corresponding to different operation sets. In FIG. 2C, the production timeline 230 has three operations $O_7$, $O_8$ and $O_9$, with time constraint TC3 existing between operations $O_7$ and $O_8$, and with time constraint TC4 existing between operations $O_8$ and $O_9$. FIG. 2D is a schematic diagram of an overlapping time constraint. The production timeline 240 has four operations $O_{10}$, $O_{11}$, $O_{12}$ and $O_{13}$. An overlapping time constraint may comprise any combination depending on process need, and may include dual-operation, multi-operation and continuous time constraints. In FIG. 2D, time constraint TC5 exists between operations $O_{10}$ and $O_{11}$; time constraint TC6 exists between operations $O_{11}$ and $O_{12}$, and time constraint TC7 exists between operations $O_{12}$ and $O_{13}$. In addition, time constraint TC8 exists between operations $O_{10}$ and $O_{12}$ and time constraint TC9 exists between operations $O_{11}$ and $O_{13}$. In this case, time constraint TC8 overlaps time constraints TC5 and TC6, time constraint TC9 overlaps time constraints TC6 and TC7, and time constraints TC8 and TC9 overlap each other.

Verifying the timeliness of the completion of process operations, by comparing the various completion times with a corresponding time constraint, addresses timeliness concerns associated with the identified process operations. However, comparing individual operational milestones (e.g., operation completion times) against a time constraint ignores many of the complexities of managing the manufacture of multiple lots through a production process. For example, when time constraints overlap, the difficulty of managing the production process across the various lots in process increases dramatically. With the lack of an effective control mechanism, lots may be accepted to the production line simply to satisfy some time constraints. Under these uncontrolled conditions, the successful completion of one or more lots may be threatened if the lots in process encounter a bottleneck and a remnant time-constraint window is insufficient to cover the required process time to complete the manufacture of each respective lot.

Currently, process managers make separate lot dispatch decisions such that the lots avoid overlapping time constraints. This process management approach simplifies the difficulty associated with dispatch decisions. However, this process management approach ignores the dynamic nature of a manufacturing process. Specifically, this approach ignores production variance between the relative operation completion times between production lots. Thus, the inevitable production variance between production lots adds to the difficulty of achieving an optimized distribution of Work-In-Process (i.e., the lots) over the entire production schedule. Consequently, focusing on dispatch decisions alone inevitably impacts the flexibility of the original production schedule, causing higher product variability across the various completed lots.

SUMMARY OF THE INVENTION

It is therefore an object of the present invention to provide a control system and method for managing a production process that considers overlapping time constraints and manufacturing variance (e.g., shop floor timing randomness) without adversely affecting the a manufacturing schedule.

It is another object of the present invention to provide a dispatch method that accommodates overlapping time constraints in a production process.

It is another object of the present invention to provide a semiconductor product and manufacturing method incorporating the same.

To achieve the above objects, the control system according to the present invention controls a production process that includes a plurality of operations, between which a plurality of time constraints exist. The control system includes a control module having a calculation unit and a determination unit. The calculation unit defines a plurality of sub-time constraints between each two operations, generates a plurality of equations according thereto, and calculates the sub-time constraints using the equations. The determination unit then determines whether a status for each operation, defined according to a Work-In-Process (WIP) quantity between the first operation and a checked operation and a throughput rate thereof, violates the sub-time constraints between the first operation and the checked operation, and releases a lot into the production process (i.e., starts the production process for a lot) if the status for each operation satisfies a corresponding sum of the sub-time constraints.

Further, a dispatch method accommodating overlapping time constraints in a production process is provided. First, a plurality of sub-time constraints between each two operations of the production line are defined. Then, a plurality of equations are generated according to the time constraints and the sub-time constraints. Thereafter, at least one queue time between two operations is simulated, and the queue time is assigned to one of the sub-time constraints. Then, remnant sub-time constraints are calculated using the equations.

Further, a method of semiconductor product manufacturing is also provided. First, a plurality of sub-time constraints between each two operations of a production process are defined. Then, a plurality of equations are generated according to the time constraints and the sub-time constraints. Thereafter, the sub-time constraints are calculated using the equations. Afterward, a status for each operation is defined according to a WIP quantity between the first operation and the checked operation of the production line and a throughput rate of the checked operation. Then, it is determined whether the status violates the sum of the time periods defined by the sub-time constraints between the first operation and the checked operation. If the status for each operation satisfies the corresponding sum of the time periods defined by the sub-time constraints, a lot of a semiconductor product is released into the production process.

BRIEF DESCRIPTION OF THE DRAWINGS

The aforementioned objects, features and advantages of this invention will become apparent by referring to the following detailed description of the preferred embodiment with reference to the accompanying drawings, wherein.

DETAILED DESCRIPTION

Figure 1:
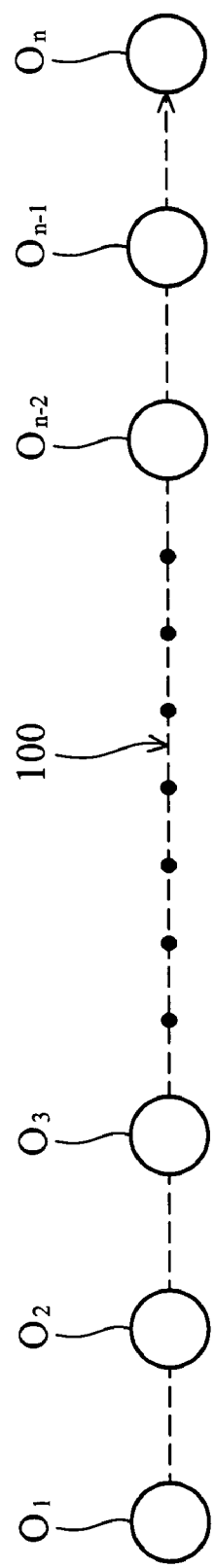
FIG. 1 is a schematic diagram illustrating production line having a plurality of operations.
Figure 2A:
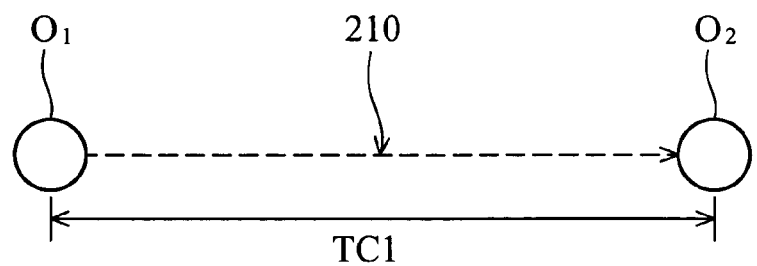
FIG. 2A is a schematic diagram of a dual-operation time constraint.
Figure 2B:
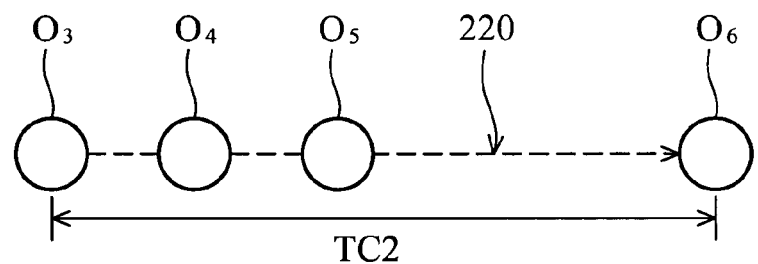
FIG. 2B is a schematic diagram of a multi-operation time constraint.
Figure 2C:
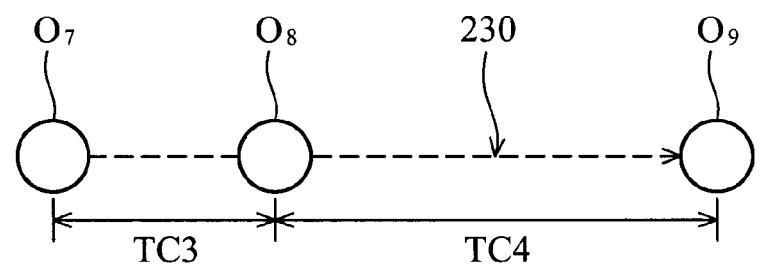
FIG. 2C is a schematic diagram of a continuous time constraint.
Figure 2D:
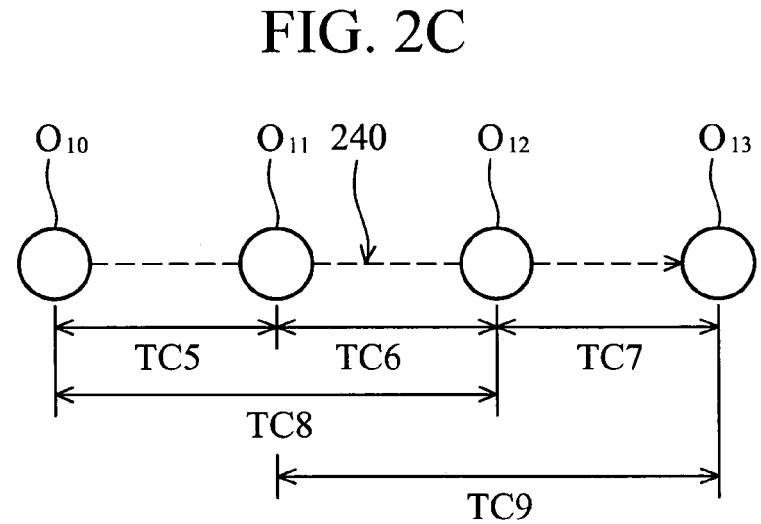
FIG. 2D is a schematic diagram of an overlapping time constraint.
Figure 3:
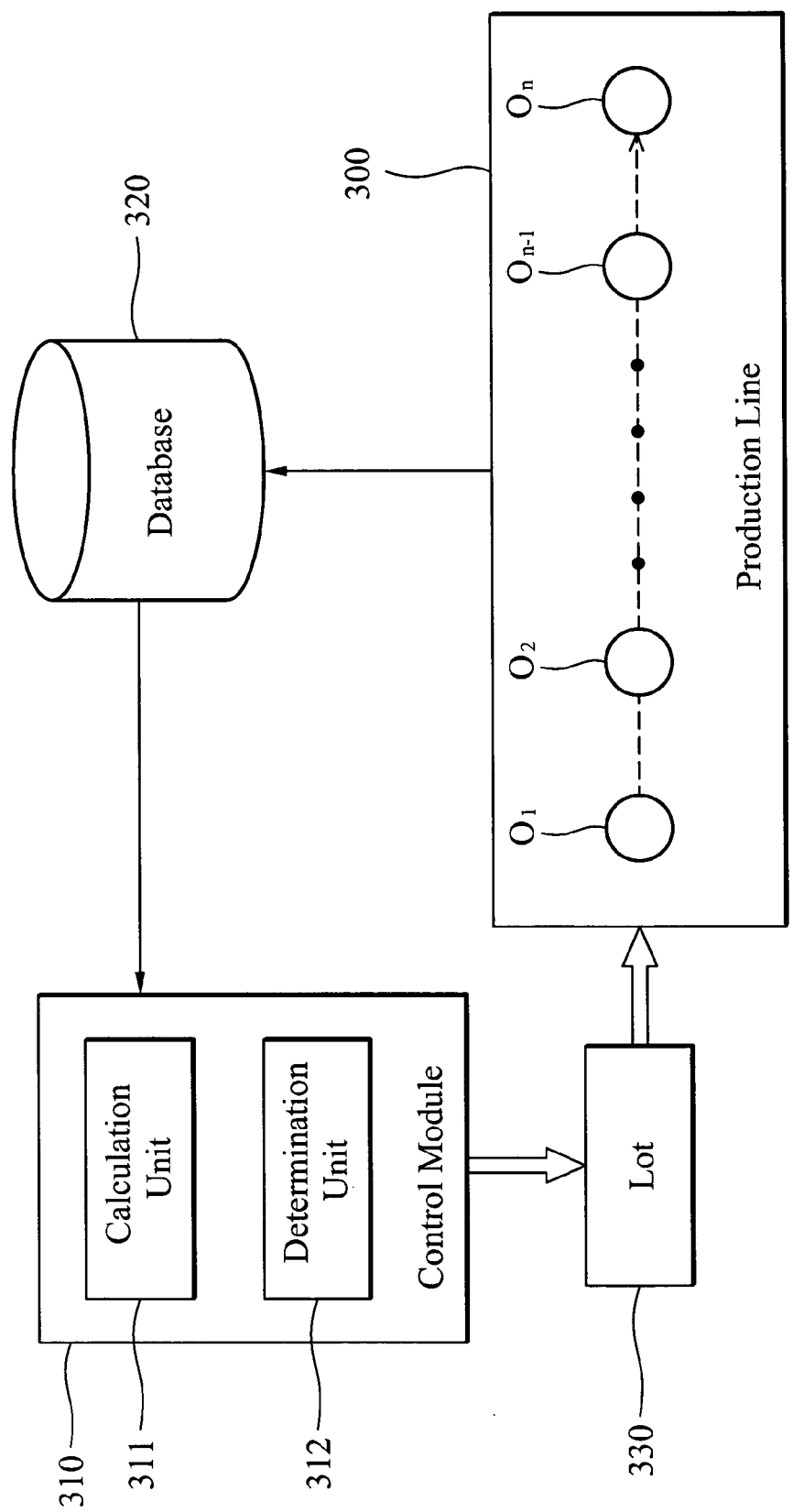
FIG. 3 is a schematic diagram illustrating the architecture of the control system for a production line with overlapping time constraints according to the present invention.

FIG. 3 illustrates the architecture of the control system and method for a controlling a production process having overlapping time constraints according to the present invention.

The control system according to the embodiment of the present invention includes a production line 300, a control module 310, and a database 320. The production line 300 has a plurality of operations ($O_1$, $O_2$, . . . , $O_{n-1}$, $O_n$), in which a plurality of time constraints includes dual-operation, multi-operation, continuous and overlapping time constraints. The database 320 records information used by the control module 310, such as the process time for each operation, the time constraints of the production line 300, and WIP (Work-In-Process) information. It should be noted that the database 320 may exist in a MES (Manufacturing Execution System).

The control module 310 has a calculation unit 311 and a determination unit 312. The calculation unit 311 performs a dispatching rule to cut the overlapping time constraints into one or more sub-time constraints between operations. The determination unit 312 determines whether a status for each operation violates the sum of the periods represented by the one or more sub-time constraints between a first operation and a checked operation, and releases a lot 330 into the production line 300 if the status for each operation satisfies (i.e., is less than) the corresponding sum of the sub-time constraints at that point in the production schedule. Detailed operation of the control module 310 will be discussed later.

Figure 4:
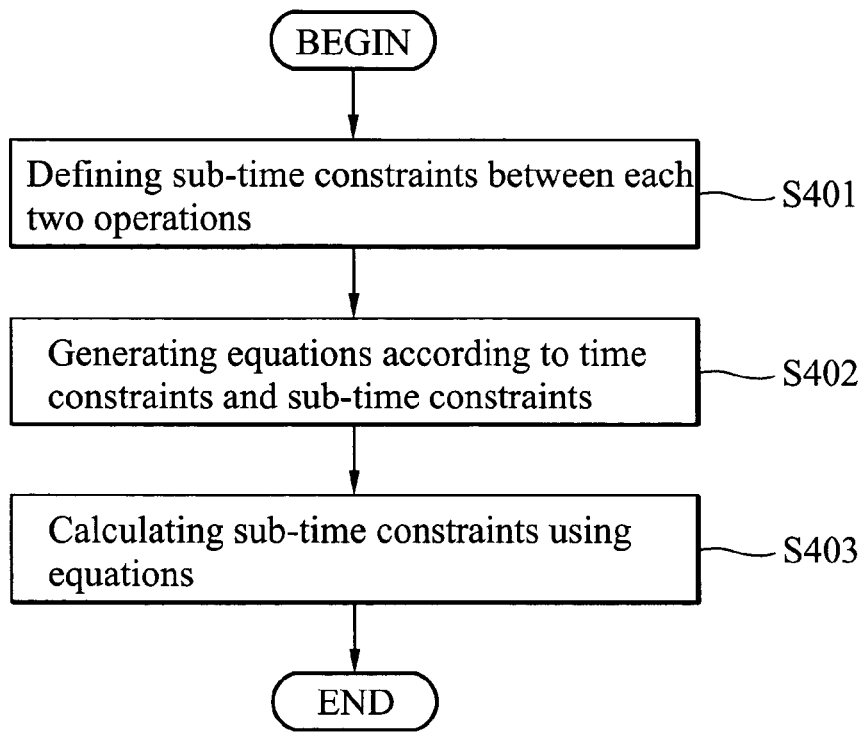
FIG. 4 is a flowchart showing the operation of the calculation unit of the control module according to the present invention.

FIG. 4 shows the operation of the calculation unit 311 of the control module 310 according to the present invention. First, in step S401, the calculation unit 311 defines a plurality of sub-time constraints (unknown variables) between each two operations of the production line 300. Then, in step S402, the calculation unit 311 generates a plurality of equations representing functions of the sub-time constraints and the time constraints recorded in the database 320. Thereafter, in step S403, the calculation unit 311 calculates the sub-time constraints using the equations and a dispatch method.

Figure 5:
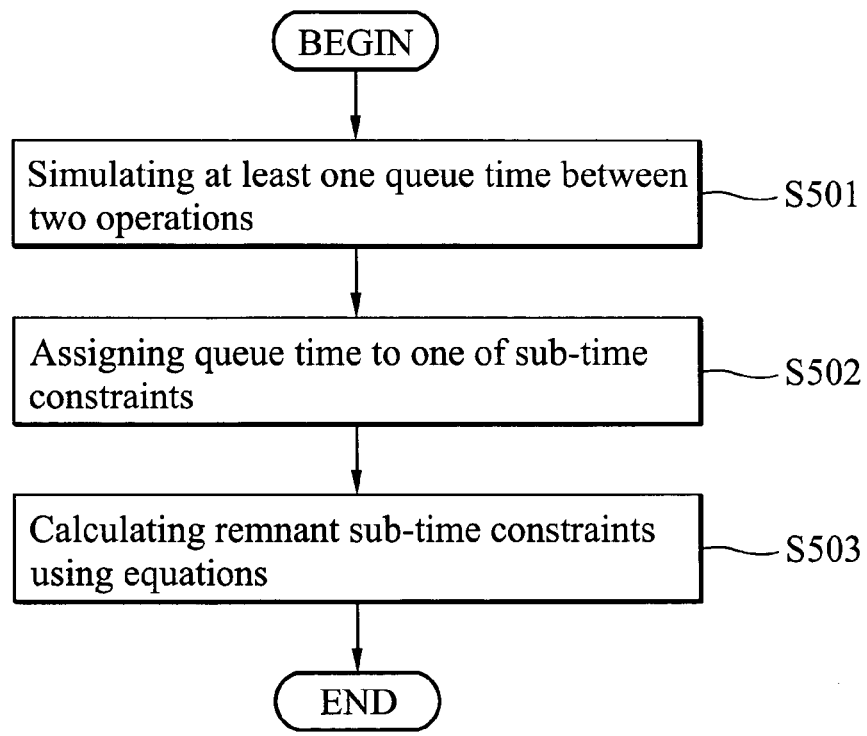
FIG. 5 is a flowchart showing the process of the dispatch method according to the present invention.

FIG. 5 shows the process of the dispatch method according to the present invention. First, instep S501, at least one queue time between two operations is simulated. Thereafter, in step S502, the queue time is assigned to at least one of the sub-time constraints. Then, in step S503, the remnant sub-time constraints are calculated using the equations generated by the calculation unit 311. It should be noted that the simulation in step S501 will stop when enough variables in the equations become known. This condition will be satisfied when the number of unknown variables equals the difference of the number of unknown variables and the number of equations.

Figure 6:
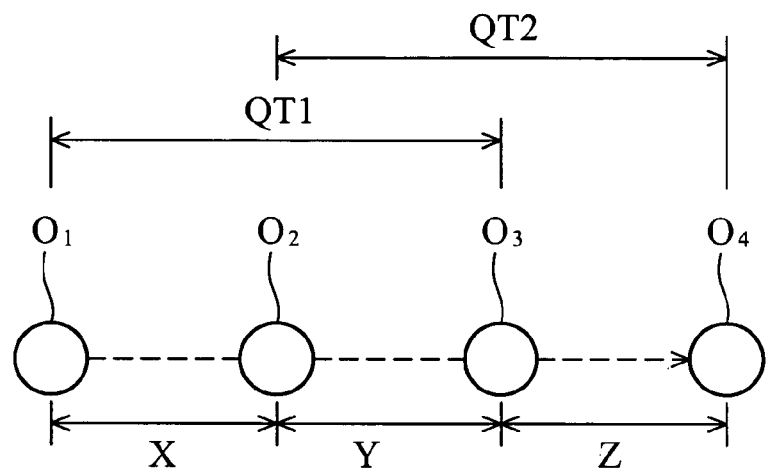
FIG. 6 is a schematic diagram showing an example of a production line having four operations.

FIG. 6 illustrates an example of a production line performing a process having four operations $O_1$, $O_2$, $O_3$ and $O_4$, in which the time constraint between operations $O_1$ and $O_3$ is QT1, and the time constraint between operations $O_2$ and $O_4$ is QT2. First, the calculation unit 311 defines maximum time periods x, y and z corresponding to the sub-time constraints between operations $O_1$ and $O_2$, $O_2$ and $O_3$, and $O_3$ and $O_4$, respectively. Thus, two equations are generated as follows:

$$QT1 = x + y \qquad \text{(Eq. 1)}$$

$$QT2 = y + z \qquad \text{(Eq. 2)}$$

Note that time constraints, QT1 and QT2 do not necessarily encompass the process time for operations $O_1$, $O_2$, $O_3$, and $O_4$. In addition, it should be understood that equations 1 and 2 above represent the maximum acceptable time period between the completion of defined production process operations. Actual time periods x, y and z can vary and will change dynamically in accordance with production line timing variance. Consequently, time constraints QT1 and QT2 will be satisfied as long as the respective sums in equations 1 and 2 do not exceed the period associated with each constraint in the database 320.

In addition to time periods x, y and z, the calculation unit 311 also defines x', y' and z', the actual queue time of a specific lot between operations $O_1$ and $O_2$, $O_2$ and $O_3$, and $O_3$ and $O_4$, respectively. Thus, a lot can only be processed by operation $O_1$ without rework or scrap if the following equations are satisfied.

$$x' < x \quad \text{(Eq. 3)}$$

$$y' < y \quad \text{(Eq. 4)}$$

$$z' < z \quad \text{(Eq. 5)}$$

The above equations 3~5 can be simplified using equations 1 and 2 to provide equations 6~8 below.

$$x' < x \quad \text{(Eq. 6)}$$

$$x' + y' < x + y = QT1 \quad \text{(Eq. 7)}$$

$$x' + y' + z' < x + y + z = x + QT2 \quad \text{(Eq. 8)}$$

In this case, since there are three unknown variables (time periods x, y and z) and two known equations (equations 1 and 2), the queue time between operations $O_1$ and $O_2$ (i.e., x') can be simulated and assigned to time period x. Once time period x is known, time periods y and z can be estimated using equations 7 and 8.

Figure 7:
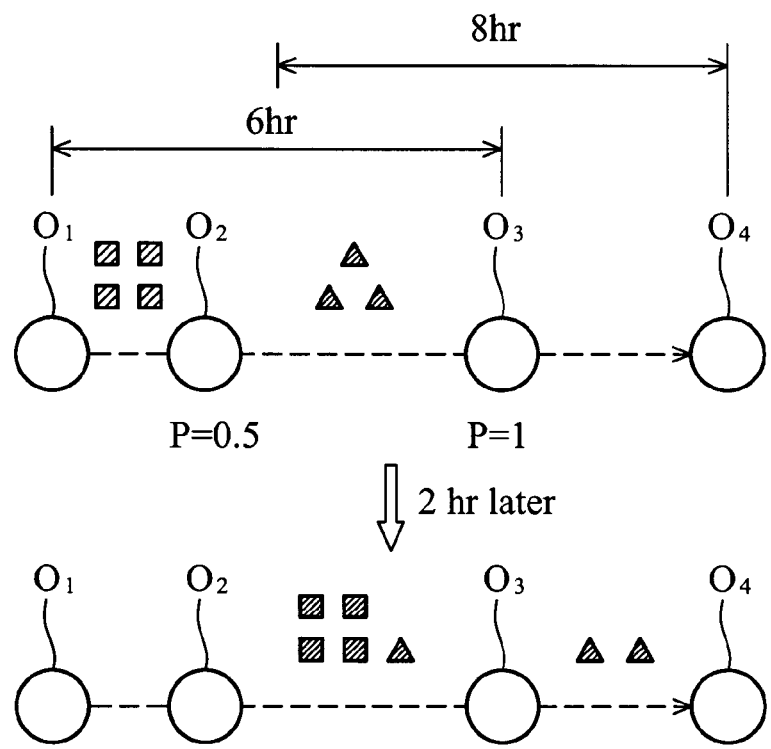
FIG. 7 is an example simulating unknown variables.

FIG. 7 is an example of simulated unknown variables. In the example, if QT1 is 6 hours, QT2 is 8 hours, the process time (p) of operation $O_2$ is 0.5 hour/lot, the process time of operation $O_3$ is 1 hour/lot, the initial queuing WIP between operations $O_1$ and $O_2$ is 4 lots, and queuing WIP between operations $O_2$ and $O_3$ is 3 lots. After 2 hours (4 lots processed by operation $O_2$, and 2 lots by operation $O_3$), the queued lots between operations $O_2$ and $O_3$ become 5 lots. Since x'=2=4*0.5 and x' is assigned to x, the time periods y and z can be estimated using equations 7 and 8, which result in y=4 and z=4. The use of the ESTIMATED RESULT (time periods) will discussed later.

Figure 8:
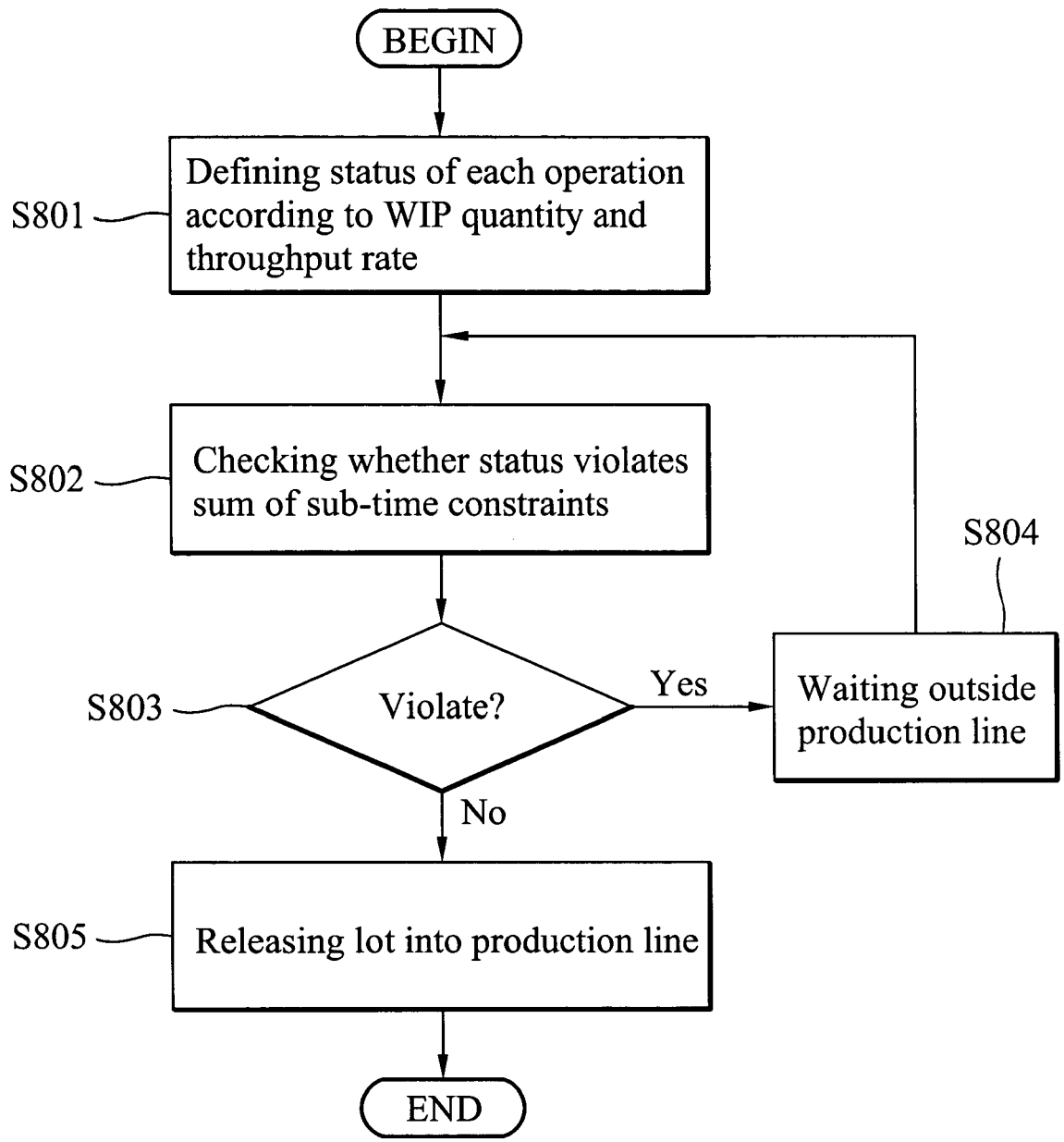
FIG. 8 is a flowchart showing the operation of the determination unit of the control module according to the present invention.

FIG. 8 shows the operation of the determination unit 312 of the control module 310 according to the present invention. First, in step S801, the determination unit 312 defines a status for each operation according to Little's law as follows:

$$S = WIP(o_1, o_n)/WPH(o_n), \quad \text{(Eq. 9)}$$

where S is the status of a checked operation, $WIP(o_1, o_n)$ is the amount of WIP between the first operation $O_1$ and the checked operation $O_n$, and $WPH(o_n)$ is the throughput rate of the checked operation $O_n$, in which $WPH(o_n)$ equals the reciprocal of the process time of the checked operation $O_n$.

In accordance with equation 9, "x'", "x'+y'", and "x'+y'+z'" can be estimated as follows:

$$S_{O_2} = x' = WIP(o_1, o_2)/WPH(o_2) \quad \text{(Eq. 10)}$$

$$S_{O_3} = x' + y' = WIP(o_1, o_3)/WPH(o_3) \quad \text{(Eq. 11)}$$

$$S_{O_4} = x' + y' + z' = WIP(o_1, o_4)/WPH(o_4) \quad \text{(Eq. 12)}$$

It should be noted that the status for each operation can further consider a process time for each operation between the first operation and the checked operation. If process time for operation $O_2$ is considered, equation 9 becomes:

$$S = (WIP(o_1, o_n)/WPH(o_n)) - PT(o_2, o_{n-1}), \quad \text{(Eq. 13)}$$

where S is the status of the checked operation, $WIP(o_1, o_n)$ is the amount of WIP between the first operation, $O_1$, and the checked operation, $O_n$, $WPH(o_n)$ is the throughput rate of the checked operation, $O_n$, and $PT(o_2, o_{n-1})$ is the total process time of operations between the first operation and the subsequent checked operation ($o_2 \sim o_{n-1}$) except that process time attributed to the first operation $O_1$ and the checked operation $O_n$.

Similarly, equations 10, 11 and 12 can be modified as follows:

$$S_{O_2} = x' = WIP(o_1, o_2)/WPH(o_2) \quad \text{(Eq. 14)}$$

$$S_{O_3} = x' + Y' = (WIP(o_1, o_3)/WPH(o_3)) - PT(o_2, o_2) \quad \text{(Eq. 15)}$$

$$S_{O_4} = x' + y' + z' = (WIP(o_1, o_4)/WPH(o_4)) - PT(o_2, o_3) \quad \text{(Eq. 16)}$$

Then, in step S802, the determination unit 312 determines whether the status for each operation violates the sum of the time periods associated with the sub-time constraints between the first operation and the checked operation. That is, the determination unit 312 determines whether $S_{O_2}$ is equal to or less than x, $S_{O_3}$ is equal to or less than x+y, and $S_{O_4}$ is equal to or less than x+y+z.

If any status violates its corresponding constraint (the sum of the periods associated with the sub-time constraints, represented by the logic branch labeled, "Yes" exiting step S803), in step S804, a lot of a semiconductor product waits outside the production line 300, and the flow returns to step S802. Otherwise, when a status meets its corresponding constraint (represented by the logical branch labeled, "No" in step S803), in step S805, the lot is released into the production line 300, and the production process is followed to manufacture the semiconductor product. In the case of FIG. 7, the lot is not released into the production line since $S_{O_3} = (WIP(o_1, o_3)/WPH(o_3)) - PT(o_2, o_2) = ((4+3)/1) - 0.5 = 6.5$ is greater than 6=(x+y).

As a result, the control system and method for controlling a production process operating under time constraints according to the present invention can minimize fabrication variability and rework rate across products lots by taking advantage of production line timing variance between production operations and avoiding the practice of focusing only on overlapping time constraints when making dispatch decisions throughout the production process.

The methods and system of the present invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to application specific logic circuits.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A control system for managing a production schedule having time constraints that define a maximum elapsed time between operations, comprising:
   a calculation unit configured to define a plurality of sub-time constraints between each two operations of the production schedule, generate a plurality of equations representing functions of the time constraints and the sub-time constraints, and calculate a value for the sub-time constraints with the equations; and
   a determination unit configured to define a status for each operation according to a Work-In-Process (WIP) quantity between a first operation and a checked operation of the production line and a throughput rate of the checked operation, check whether the status violates any of the sub-time constraints between the first operation and the checked operation, and release a lot into the production line if the status for each operation satisfies the corresponding sum of the sub-time constraints.

2. The control system as claimed in claim 1 wherein the calculation unit further simulates at least one queue time between two operations, and assigns the queue time to one of the sub-time constraints, thereby obtaining a remnant sub-time constraint.

3. The control system as claimed in claim 1 wherein the status is defined as follows:

$$S = WIP(o_1, o_n)/WPH(o_n),$$

wherein S is the status of a checked operation ($O_n$), WIP($o_1, o_n$) is the WIP quantity between the first operation ($O_1$) and the checked operation ($O_n$), and WPH($o_n$) is the throughput rate of the checked operation ($O_n$).

4. The control system as claimed in claim 1 wherein the status for each operation is further defined according to a process time for each operation between the first operation and the checked operation except that process time attributed to the first operation ($O_1$) and the checked operation ($O_n$).

5. The control system as claimed in claim 4 wherein the status is defined as follows:

$$S = (WIP(o_1, o_n)/WPH(o_n)) - PT(o_2, o_{n-1}),$$

wherein S is the status of a subsequent checked operation ($o_2 \sim o_{n-1}$) WIP($o_1, o_n$) is the WIP quantity between the first operation ($O_1$) and the checked operation ($O_n$), WPH($o_n$) is the throughput rate of the checked operation ($O_n$), and PT($o_2, o_{n-1}$) is the total process time of operations between the first operation ($O_1$) and the subsequent checked operation ($o_2 \sim o_{n-1}$) except that process time attributed to the first operation ($O_1$) and the checked operation ($O_n$).

6. The control system as claimed in claim 1 wherein the time constraints comprise overlapping time constraints.

7. The control system as claimed in claim 1 wherein the time constraints comprise a constraint selected from the group consisting of dual-operation, multi-operation, and continuous time constraints.

8. The control system as claimed in claim 1 wherein a production line is directed to perform related operations if the lot is released to the production line.

9. The control system as claimed in claim 8 wherein the production line is a production line for manufacturing semiconductor products.

10. A method for managing a production schedule having time constraints that define a maximum elapsed time between operations, comprising the steps of:
    defining a plurality of sub-time constraints between each two operations;
    generating plurality of equations according to the time constraints and the sub-time constraints;
    calculating the sub-time constraints using the equations;
    defining a status for each operation according to a Work-In-Process (WIP) quantity between a first operation and a checked operation of the production schedule and a throughput rate of the checked operation;
    checking whether the status violates the sum of the calculated sub-time constraints between the first operation and the checked operation; and
    releasing a lot if the status for each operation satisfies the corresponding sum of the sub-time constraints.

11. The method as claimed in claim 10 further comprising simulating at least one queue time between two operations, and assigning the queue time to one of the sub-time constraints, thereby obtaining a remnant sub-time constraint.

12. The method as claimed in claim 10 wherein the status is defined as follows:

$$S = WIP(o_1, o_n)/WPH(o_n),$$

wherein S is the status of a checked operation ($O_n$), WIP($o_1, o_n$) is the WIP quantity between the first operation ($O_1$) and the checked operation ($O_n$), and WPH($o_n$) is the throughput rate of the checked operation ($O_n$).

13. The method as claimed in claim 10 further comprising defining the status for each operation according to a process time for each operation between the first operation and the checked operation except that process time attributed to the first operation ($O_1$) and the checked operation ($O_n$).

14. The method as claimed in claim 13 wherein the status is defined as follows:

$$S = (WIP(o_1, o_n)/WPH(o_n)) - PT(o_2, o_{n-1}),$$

wherein S is the status of a subsequent checked operation ($o_2 \sim o_{n-1}$), WIP($o_1, o_n$) is the WIP quantity between the first operation ($O_1$) and the checked operation ($O_n$), WPH($o_n$) is the throughput rate of the checked operation ($O_n$), and PT($o_2, o_{n-1}$) is the total process time of operations between the first operation ($O_1$) and the subsequent checked operation ($o_2 \sim o_{n-1}$) except that process time attributed to the first operation ($O_1$) and the checked operation ($O_n$).

15. The method as claimed in claim 10 wherein the time constraints comprise overlapping time constraints between the operations.

16. The method as claimed in claim 10 wherein the time constraints comprise a constraint selected from the group consisting of dual-operation, multi-operation, and continuous time constraints.

17. The method as claimed in claim 10 further comprising performing related operations if the lot is released to a production line.

18. The method as claimed in claim 17 wherein the production line is a production line for semiconductor products.

19. A dispatch method that accommodates overlapping time constraints that define a maximum elapsed time between select operations in a production schedule, comprising the steps of:
    defining a plurality of sub-time constraints between each two operations;
    generating plurality of equations according to the time constraints and the sub-time constraints;
    simulating at least one queue time between two operations;

assigning the queue time to one of the sub-time constraints; and calculating a remnant sub-time constraint using the equations.

20. The dispatch method as claimed in claim 19 wherein the production schedule is applied in manufacturing semiconductor devices.

21. A method for managing the manufacture of production lots of semiconductor devices, the method operable on a production schedule defining a plurality of time constraints between corresponding production operations, comprising the steps of:

defining a plurality of sub-time constraints between each two operations;

generating plurality of equations according to the time constraints and the sub-time constraints;

calculating the sub-time constraints using the equations;

defining a status for each operation according to a Work-In-Process (WIP) quantity between a first operation and a checked operation and a throughput rate of the checked operation;

checking whether the status violates the sum of the sub-time constraints between the first operation and the checked operation;

releasing a lot of a semiconductor product into a production line when the status for each operation satisfies the corresponding sum of the sub-time constraints; and manufacturing the semiconductor product when the lot is released to the production line.

22. The method as claimed in claim 21 further comprising simulating at least one queue time between two operations, and assigning the queue time to one of the sub-time constraints, thereby obtaining a remnant sub-time constraint.

23. The method as claimed in claim 21 wherein the status is defined as follows:

$$S=WIP(o_1,o_n)/WPH(o_n),$$

wherein S is the status of a checked operation ($O_n$), WIP($o_1,o_n$) is the WIP quantity between the first operation ($O_1$) and the checked operation ($O_n$), and WPH($o_n$) is the throughput rate of the checked operation ($O_n$).

24. The method as claimed in claim 21 further comprising defining the status for each operation according to a process time for each operation between the first operation and the checked operation except that process time attributed to the first operation ($O_1$) and the checked operation ($O_n$).

25. The method as claimed in claim 24 wherein the status is defined as follows:

$$S=(WIP(o_1,o_n)/WPH(o_n))-PT(o_2,o_{n-1})),$$

wherein S is the status of a subsequent checked operation ($o_2$~$o_{n-1}$), WIP($o_1,o_n$) is the WIP quantity between the first operation ($O_1$) and the checked operation ($O_n$), WPH($o_n$) is the throughput rate of the checked operation ($O_n$), and PT($o_2,o_{n-1}$) is the total process time of operations between the first operation ($O_1$) and the subsequent checked operation ($o_2$~$o_{n-1}$) except that process time attributed to the first operation ($O_1$) and the checked operation ($O_n$).

26. The method as claimed in claim 21 wherein the time constraints comprise overlapping time constraints between the operations.

27. The method as claimed in claim 21 wherein the time constraints comprise a constraint selected from the group consisting of dual-operation, multi-operation, and continuous time constraints.

28. The method as claimed in claim 21 wherein the step of manufacturing the semiconductor product comprises performing related operations thereon.

29. A semiconductor product produced according to the method for managing the manufacture of production lots of semiconductor devices of claim 21.

30. A semiconductor product produced according to the method for managing the manufacture of production lots of semiconductor devices of claim 22.

31. A semiconductor product produced according to the method for managing the manufacture of production lots of semiconductor devices of claim 23.

32. A semiconductor product produced according to the method for managing the manufacture of production lots of semiconductor devices of claim 24.

33. A semiconductor product produced according to the method for managing the manufacture of production lots of semiconductor devices of claim 25.

34. A semiconductor product produced according to the method for managing the manufacture of production lots of semiconductor devices of claim 26.

35. A semiconductor product produced according to the method for managing the manufacture of production lots of semiconductor devices of claim 27.

36. A semiconductor product produced according to the method for managing the manufacture of production lots of semiconductor devices of claim 28.

37. A computer-readable medium comprising executable instructions for controlling a production schedule defining a plurality of time constraints between corresponding production operations, comprising:

computer-readable program code for defining a plurality of sub-time constraints between each two operations;

computer-readable program code for generating a plurality of equations according to the time constraints and the sub-time constraints;

computer-readable program code for calculating the sub-time constraints using the equations;

computer-readable program code for defining a status for each operation according to a Work-In-Process (WIP) quantity between the first operation and the checked operation of the production schedule and a throughput rate of the checked operation;

computer-readable program code for checking whether the status violates the sum of the sub-time constraints between the first operation and the checked operation; and computer-readable program code for releasing a lot into the production line if the status for each operation satisfies the corresponding sum of the sub-time constraints.

38. The computer-readable medium as claimed in claim 37 further comprising computer-readable program code for simulating at least one queue time between two operations, and assigning the queue time to one of the sub-time constraints, thereby obtaining a remnant sub-time constraint.

39. The computer-readable medium as claimed in claim 37 wherein the status is defined as follows:

$$S=WIP(o_1,o_n)/WPH(o_n),$$

wherein S is the status of a checked operation ($O_n$), WIP($o_1,o_n$) is the WIP quantity between the first operation ($O_1$) and the checked operation ($O_n$), and WPH($o_n$) is the throughput rate of the checked operation ($O_n$).

40. The computer-readable medium as claimed in claim 37 further comprising computer-readable program code for defining the status for each operation according to a process time for each operation between the first operation and the checked operation except that process time attributed to the first operation ($O_1$) and the checked operation ($O_n$).

41. The computer-readable medium as claimed in claim 40 wherein the status is defined as follows:

$$S=(WIP(o_1,o_n)/WPH(o_n))-PT(o_2,o_{n-1}),$$

wherein S is the status of a subsequent checked operation ($o_2$~$o_{n-1}$) $WIP(o_1,o_n)$ is the WIP quantity between the first operation ($O_1$) and the checked operation ($O_n$), $WPH(o_n)$ is the throughput rate of the checked operation ($O_n$), and $PT(o_2,o_{n-1})$ is the total process time of operations between the first operation ($O_1$) and the subsequent checked operation ($o_2$~$o_{n-1}$) except that process time attributed to the first operation ($O_1$) and the checked operation ($O_n$).

42. The computer-readable medium as claimed in claim 37 wherein the time constraints comprise overlapping time constraints between the operations.

43. The computer-readable medium as claimed in claim 37 wherein the time constraints comprise a constraint selected from the group consisting of dual-operation, multi-operation, and continuous time constraints.

44. The computer-readable medium as claimed in claim 37 wherein the production line is a production line for semiconductor products.

45. A computer-readable medium for dispatching product lots in a in a production process having a plurality of overlapping time constraints between corresponding production operations, comprising:
   computer-readable program code for defining a plurality of sub-time constraints between each two operations;
   computer-readable program code for generating plurality of equations according to the time constraints and the sub-time constraints;
   computer-readable program code for simulating at least one queue time between two operations;
   computer-readable program code for assigning the queue time to one of the sub-time constraints; and
   computer-readable program code for calculating a remnant sub-time constraint using the equations.

46. The computer-readable medium as claimed in claim 45 wherein the production process is a production process for manufacturing semiconductor products.

* * * * *

UNITED STATES PATENT AND TRADEMARK OFFICE
CERTIFICATE OF CORRECTION

| | | |
|---|---|---|
| PATENT NO. | : 7,054,703 B2 | Page 1 of 1 |
| APPLICATION NO. | : 10/658826 | |
| DATED | : May 30, 2006 | |
| INVENTOR(S) | : Kan Wu and Wei-Jai Hung | |

It is certified that error appears in the above-identified patent and that said Letters Patent is hereby corrected as shown below:

On the title page item(54), and col. 1, line 3, replace the word "CONSTARAINTS" with 'CONSTRAINTS.'

Signed and Sealed this

Twenty-second Day of August, 2006

JON W. DUDAS
*Director of the United States Patent and Trademark Office*